Dec. 18, 1934.   R. B. WENNER   1,985,128
INTERNAL SHOE AND DRUM BRAKE
Filed Nov. 22, 1932   2 Sheets-Sheet 1

Inventor:—
Rolland B. Wenner
by his Attorneys
Howson & Howson

Dec. 18, 1934.     R. B. WENNER     1,985,128
INTERNAL SHOE AND DRUM BRAKE
Filed Nov. 22, 1932     2 Sheets-Sheet 2

Patented Dec. 18, 1934

1,985,128

UNITED STATES PATENT OFFICE 1,985,128

INTERNAL SHOE AND DRUM BRAKE

Rolland B. Wenner, Wilson Borough, Pa., assignor to Easton Trust Company, Easton, Pa., a corporation of Pennsylvania Application November 22, 1932, Serial No. 643,802

4 Claims. (Cl. 188—78)

This invention relates to new and useful improvements in braking devices and more particularly to braking devices of the internal shoe and drum type.

The principal object of the invention is to provide a braking device of the character set forth having novel means operable to insure equalized expansion of shoe elements into uniform contact with the surface of a drum.

Another object of the invention is to provide a braking device of the stated character wherein scoring or uneven wearing of the drum surface is reduced to a minimum.

A further object of the invention is to provide a braking device of the stated character wherein so-called brake "dragging" is substantially eliminated.

Figure 1:
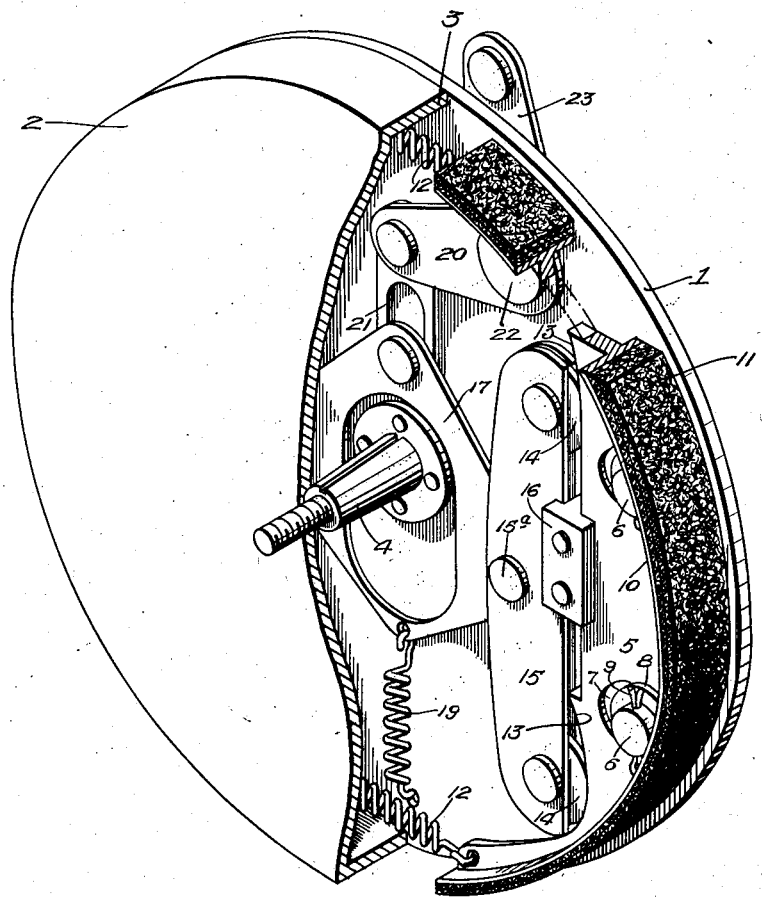
Figure 2:
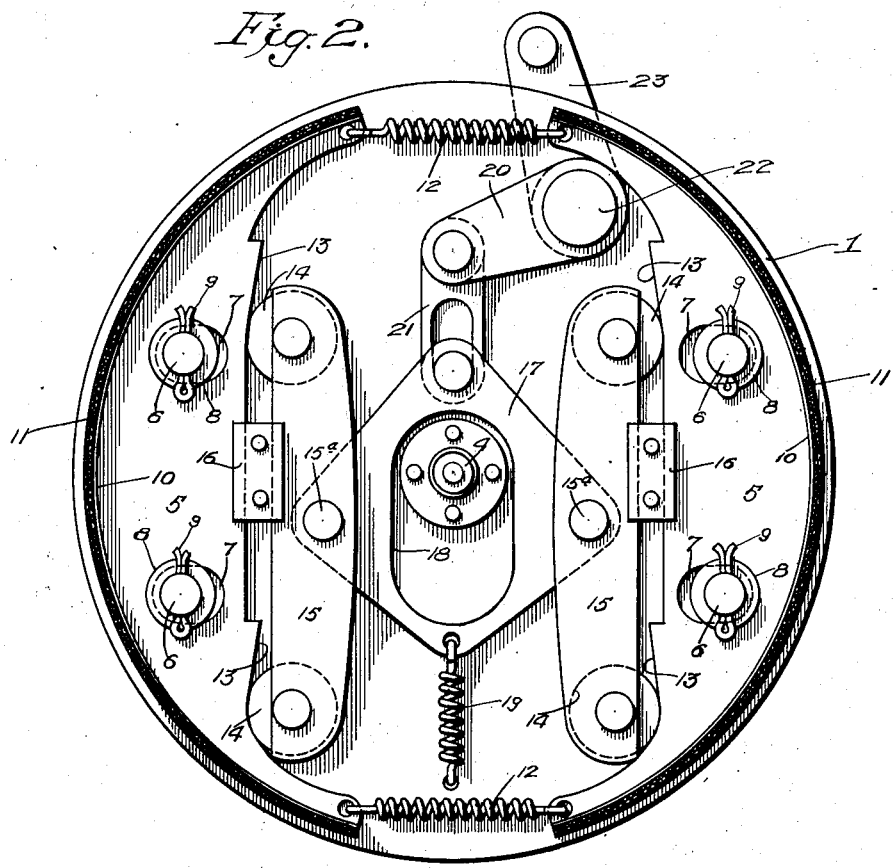

Other features and objects of the invention and the details of construction thereof are set forth hereinafter and shown in the accompanying drawings, in which:

Fig. 1 is a view in perspective of the device constituting the present invention having a portion of the drum casing removed; and Fig. 2 is a view in elevation of the invention with the drum or casing entirely removed.

Referring now more particularly to the drawings the braking device comprises a relatively stationary member 1 in the form of a disk, and a relatively rotatable member or drum 2 having a side wall 3 the outer edge of which slidably contacts the adjacent face of the stationary member 1 at its circumference. A shaft or spindle 4 extends centrally through each of the members 1 and 2 and is arranged, in the present instance, to receive a wheel or other member (not shown) which is secured to the drum member 2 in order that both the said drum and wheel may rotate together as a unit relatively with respect to the stationary member 1.

In the present instance brake shoe elements 5 each having an arcuate peripheral surface 10 of the same curvature as the inner surface of the drum wall 3, are slidably mounted on the stationary member 1, by means of pins 6, for movement in opposite directions radially with respect to the stationary member 1. The pins 6 are secured in the member 1 and extend through slots 7 in the elements 5 as shown, the said elements being retained in position on the pins 6 by means of a washer 8 and cotter pin 9.

The peripheral surface 10 of the shoe elements 5 is of substantially the same width or breadth as the walls of the rotatable drum member 2, and friction elements 11 are secured to this surface as shown and arranged to contact the inner surface of the drum wall 3 thus retarding relative rotation thereof with respect to the stationary member 1, when the elements 5 are moved radially of the stationary member 1. As shown in the drawings the extremities of each of the shoes 5 are connected by means of tension springs 12 which function to retain said shoes in their inner or retracted position out of contact with the wall 3 of the drum 2.

In the present instance each of the shoe elements 5 are provided at their inner edge with inclined cam surfaces 13, on each of which rides a roller 14 which is rotatably mounted adjacent the ends of an elongated member or carriage 15 spaced from said shoes 5 by means of blocks 16. Each of the elongated carriages 15 is pivotally connected at its mid-point 15a to opposite apices of a bracket member 17 having an elongated slot 18 therein through which extends the aforementioned shaft 4. This arrangement permits movement of the bracket diametrically of the member 1 in a direction at right angles to the path of movement of the shoes 5.

The bracket member 17 is also connected at its bottom end to the stationary member 1 by means of a tension spring 19 and at its upper end to one end of a lever 20 by means of a slotted link 21. The other end of the lever 20 is pivotally connected to the stationary member 1 by means of a pivot pin 22, on the other end of which is mounted a lever arm 23 for connection to a suitable actuating mechanism not shown in the drawings.

In the present instance the spring 19 functions to maintain the bracket 17 in its lowermost position, reference being had to Fig. 2 of the drawings, so that the rollers 14 of the pivotally mounted carriages are withdrawn from the cam surfaces 13 on the shoes 5, thus relieving the radial or expansion force upon said shoes and allowing the springs 12 to retain them in their retracted position so that the friction elements 11 do not contact the wall 2 of the drum 2.

In operation of the braking device to retard or stop relative rotation of the drum 2 with respect to the member 1, the lever arm 23 is actuated in a clockwise direction with respect to the figures in the drawings. Rotation of the lever 23 in the direction stated similarly rotates the lever arm 20 and moves the bracket 17 diametrically of the member 1 against the tension of spring 19. The carriages 15 move with the bracket 17 and the rollers 14 carried thereby ride up the inclined cam surfaces 13 and actuate the shoes 5 in opposite radial directions with respect to each other. Sufficient radial movement of the shoes 5 places the friction elements or strips 11 on the peripheral surfaces of said shoes into contact with the inner surface of the wall 3 of the drum 2 and results in retarding rotation of the latter, with respect to the stationary member 1, to an extent dependent upon the applied force exerted on the lever 23.

It is pointed out that the position of the cam surfaces on the elements 5 and their relation to the other component elements of the device enable the said friction elements to be uniformly and evenly placed into contact with the drum 2 to produce an equalized retarding force thereon and effectually eliminate uneven wearing of the drum and the friction strips, as well as ultimate "dragging" of the brake as a result thereof.

As the actuating force or pressure is relieved from the lever 23 the spring 19 returns the bracket 17 and the carriages 15 to the position shown in the drawings relieving the radial thrust against the shoes 5 and allowing the springs 12 to withdraw the friction elements 11 from contact with the drum 2.

Any customary or otherwise desirable mechanism may be employed for the purpose of actuating the lever 23 to move the bracket and expand the shoes 5 radially to place the friction elements 11 into contact with the drum, and while certain other details of construction have been set forth for the purpose of a description of the invention it is not intended that the invention be precisely limited thereto except as set forth in the annexed claims.

I claim the following:—

1. In a brake of the drum type comprising a stationary and relatively rotatable member and a wheel shaft extending centrally therethrough, friction members movable radially in diametrically opposed directions with respect to said stationary member, said members having cam surfaces thereon, means tending to maintain said friction members in a retracted position with respect to the rotatable member, a bracket loosely surrounding the wheel shaft and slidable transversely thereof on a line perpendicular to the path of the travel of each of said friction members, elongated members intermediately pivoted on said bracket at each side thereof, said members having cam elements associated therewith arranged to ride upon the cam surfaces of the friction members, and means operable to actuate said bracket causing the cam elements to traverse the cam surfaces and actuate the friction members in radially opposite directions at right-angles to the movement of the bracket into contact with the relatively rotatable member.

2. In a brake of the drum type comprising a stationary and relatively rotatable member and a wheel shaft extending centrally therethrough, friction members movable radially in diametrically opposed directions with respect to said stationary member, said members having cam surfaces thereon, a bracket loosely surrounding the wheel shaft and slidable transversely thereof on a line perpendicular to the path of the travel of each of said friction members, members intermediately pivoted on said bracket at each side thereof, said members having cam elements associated therewith arranged to ride upon the cam surfaces of the friction members, and means operable to actuate said bracket causing the cam elements to traverse the cam surfaces and actuate the friction members in radially opposite directions at right-angles to the movement of the bracket into contact with the relatively rotatable member.

3. In a brake of the drum type comprising a stationary and relatively rotatable member and a wheel shaft extending centrally therethrough, friction members movable radially in diametrically opposed directions with respect to said stationary member, said members having cam surfaces thereon, means tending to maintain said friction members in a retracted position with respect to the rotatable member, a bracket loosely surrounding the wheel shaft and slidable transversely thereof on a line perpendicular to the path of the travel of each of said friction members, elongated members intermediately pivoted on said bracket at each side thereof, said members having cam elements associated therewith arranged to ride upon the cam surfaces of the friction members, and pressure actuated means operable to actuate said bracket causing the cam elements to traverse the cam surfaces and actuate the friction members in radially opposite directions at right-angles to the movement of the bracket into contact with the relatively rotatable member.

4. In a brake of the drum type comprising a stationary and relatively rotatable member and a wheel shaft extending centrally therethrough, friction members movable radially in diametrically opposed directions with respect to said stationary member, said members having cam surfaces thereon, a bracket loosely surrounding the wheel shaft and slidable transversely thereof on a line perpendicular to the path of the travel of each of said friction members, members intermediately pivoted on said bracket at each side thereof, said members having cam elements associated therewith arranged to ride upon the cam surfaces of the friction members, and pressure actuated means operable to actuate said bracket causing the cam elements to traverse the cam surfaces and actuate the friction members in radially opposite directions at right angles to the movement of the bracket into contact with the relatively rotatable member.

ROLLAND B. WENNER.